UNITED STATES PATENT OFFICE.

BERNHARD HEYMANN, OF WIESDORF-ON-THE-NIEDERRHEIN, RICHARD KOTHE, OF OPLADEN, NEAR COLOGNE, OSKAR DRESSEL, OF MÜLHEIM, NEAR COLOGNE, AND ANTON OSSENBECK, OF COLOGNE, GERMANY, ASSIGNORS TO SYNTHETIC PATENTS CO., INC., OF NEW YORK, N. Y., A CORPORATION OF NEW YORK.

UREIDS AND THIOUREIDS.

1,218,654.  Specification of Letters Patent.  Patented Mar. 13, 1917.

No Drawing.  Application filed December 17, 1914. Serial No. 877,683.

*To all whom it may concern:*

Be it known that we, BERNHARD HEYMANN, RICHARD KOTHE, OSKAR DRESSEL, and ANTON OSSENBECK, citizens of the German Empire, residing at, respectively, Wiesdorf-on-the-Niederrhein; Opladen, near Cologne; Mülheim, near Cologne, and Cologne, Germany, have invented new and useful Improvements in Ureids and Thioureids, of which the following is a specification.

The present invention relates to the production of derivatives of amino derivatives of aromatic substances substituted in the amino group by means of nitro derivatives of the aromatic acidyl halids, of aromatic sulfo acids, etc., reduction to the corresponding amino products and finally condensation of these substances to ureid compounds such as ureids, thioureids, etc.

These substitution derivatives of amino derivatives of aromatic substances may be again substituted by the above acidyl halids, reduced and condensed to furnish the ureids, thioureids, etc.

The ureids, thioureids, etc., of these substituted amino derivatives of aromatic substances are characterized by containing in their molecule an aggregation of the group

in which A stands for the aryl radical of an aromatic substance such as phenyl, tolyl, diphenyl, ditolyl, naphthyl, carbazyl, anthracyl, etc., in the form of their sulfo acid derivatives and which may further contain substituting groups, such as hydroxyl OH—, halogen Cl, Br, and I, the carboxyl-, etc., R stands for the residue of an acid group such as —CO—, the residue of the carboxyl group; —CS—, the residue of the thiocarboxyl group; —SO₂—, the residue of the sulfonic group, etc.; and Y for an aromatic radical, such as phenylene —C₆H₄—, naphthylene —C₁₀H₆—, and their derivatives.

As starting material the amino derivatives of aromatic substances may be employed in the form of their mono-, di-, or higher sulfonated derivatives, which may be further substituted, such as for example, amino-benzoic-sulfo-acids and their derivatives, diamino-di-phenyl-disulfonic acids and their derivatives, amino-carbazol-sulfonic acids, aminonaphthol- or naphthylamin sulfonic acids, etc. These amino derivatives of aromatic substances are substituted by nitro derivatives of aromatic acidyl halids, such as para-nitro-benzoyl-chlorid, meta-nitrobenzoyl-chlorid of the formula:

meta-nitroanisoyl-chlorid, etc., or by nitrobenzene-sulfonyl-chlorid of the formula:

or by para-nitro-phenyl-urea-chlorid of the formula:

or by 1-nitro-naphthalene-5-sulfonyl-chlorid of the formula:

or by 1.5-nitro-naphthoyl-chlorid of the formula:

The reduction of these substituted amino substances is carried out by means of iron and hydrochloric acid or by any other appropriate method furnishing products of the following general formula:

Finally these amino derivatives of the substituted amino substances are treated with phosgen, bisulfid of carbon, etc., to furnish the corresponding ureids, thioureids, etc.

For this condensation with phosgen, bisulfid of carbon, etc., we may employ two molecules of the same substituted amino substances described above with the general formula:

or we may employ one molecule each of different substituted amino substances included in the above general formula.

We may also employ for this reaction with phosgen, bisulfid of carbon, etc., one molecule of a substituted amino substance described above and one molecule of the substituted aminonaphthalene substance described in our United States patent application Serial No. 846195, filed June 19, 1914. Therefore, if the condensation is carried out with phosgen, we would obtain ureids with the following general formula:

A—NH—R—Y—NH—CO—NH—Y—R—NH—aryl in which the radicals used in the formula are to be defined as above and "aryl" means an aromatic radical different from A, such as phenyl —C$_6$H$_5$, naphthyl C$_{10}$H$_7$, etc., or substitution products thereof; and if the reaction is carried out with bisulfid of carbon, we would obtain thioureids with the following general formula under the above definition of the radicals:

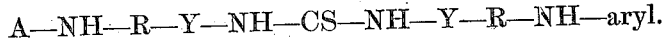
A—NH—R—Y—NH—CS—NH—Y—R—NH—aryl.

The ureids and thioureids so obtained have the following general formula:—

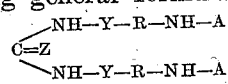

wherein Z represents a metalloid, particularly oxygen or sulfur.

If, as above stated, the acid haloids are repeatedly introduced into the amino substances, derivatives of the following general formula are obtained:

A—NH—R—Y—NH—R—Y—NH$_2$ which upon treatment with phosgen furnish ureids of the following general formula:

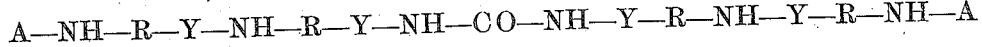
A—NH—R—Y—NH—R—Y—NH—CO—NH—Y—R—NH—Y—R—NH—A or

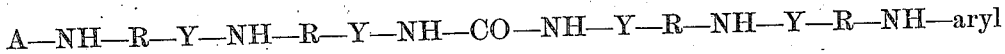
A—NH—R—Y—NH—R—Y—NH—CO—NH—Y—R—NH—Y—R—NH—aryl and with bisulfid of carbon, thioureids of the formula:

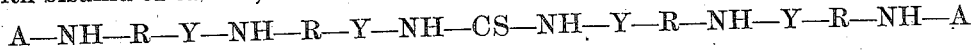
A—NH—R—Y—NH—R—Y—NH—CS—NH—Y—R—NH—Y—R—NH—A or

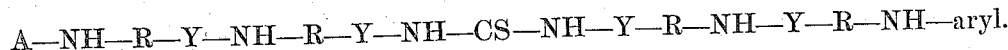
A—NH—R—Y—NH—R—Y—NH—CS—NH—Y—R—NH—Y—R—NH—aryl.

In the same manner three, four, or still more molecules of the acid haloids might be introduced into the amino substances and correspondingly more complicated substitution derivatives and finally ureids and thioureids, etc., are obtained.

In all these general formulæ R stands for a residue of an acid group.

For the formation of the substituted amino substances nitro derivatives of various acid haloids may be employed, so that in the general formula last given one R may stand for —CO— and the other for —SO$_2$—, if nitrobenzoylchlorid and nitroaryl-sulfonyl-chlorid were used for introduction into the amino substance.

The new products possess therapeutic value, as they show strong blood-parasite-destroying qualities and comparatively small injurious effect toward the host.

Many of them are also useful in the synthesis of azo dyestuffs as they combine with diazotized amins.

In carrying out our process practically, we may proceed as follows:

Example 1: 49.3 parts of the acid sodium salt obtained by the action of meta-nitrobenzoylchlorid on meta-aminobenzoyl-aminosulfonyl-salicylic acid and subsequent reduction are dissolved by addition of the necessary quantity of sodium carbonate to form the neutral salt. Then 50 parts of crystallized acetate of sodium are added and while stirring phosgen is introduced. The reaction is finished if on addition of nitrite and HCl no diazotation takes place any more. Most of the ureid separates during the operation, which separation is completed by addition of common salt. By dissolving the ureid in sodium carbonate and salting it out again the neutral sodium salt is obtained as a white precipitate. The new compound thus obtained has in a free state most probably the following formula:

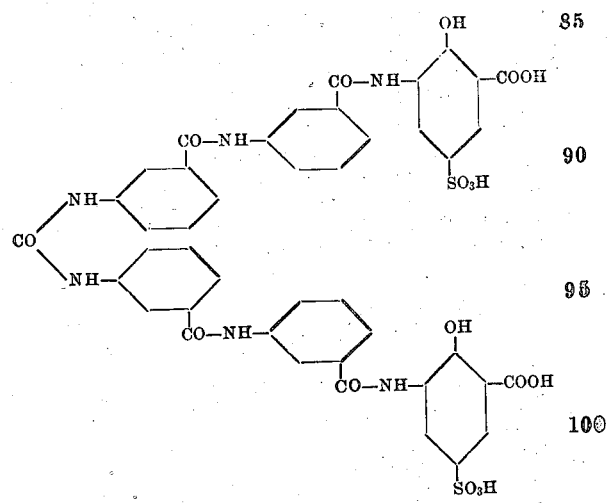

It forms salts with metals and shows strong blood parasite destroying qualities.

Example 2: 63.9 parts of the acid sodium salt of the aminoanisoyl-aminoanisoyl-1-amino-8-naphthol-4.6-disulfonic acid and 49.3 parts of the acid sodium salt of the meta-aminobenzoyl-meta-amino-benzoyl-amino-sulfonyl-salicylic acid are mixed and dissolved by addition of sodium carbonate to form the neutral salt. Then 100 parts of crystallized sodium acetate are added and while stirring phosgen is introduced into this solution until on addition of nitrite and HCl no diazotation takes place any more. The product of the reaction is isolated as is indicated in Example 1. The new acid thus obtained has in a free state most probably the following formula:

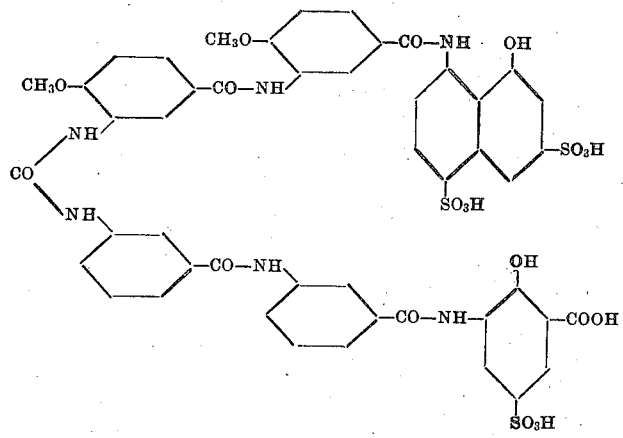

Example 3: 56.5 parts of the acid sodium salt obtained by the action of para-nitrobenzoyl chlorid upon 1-aminonaphthalene-3.6-disulfonic acid, subsequent reduction and introduction of the meta-nitro-benzoyl residue into the resulting acid and subsequent reduction and in the free acid form having the formula

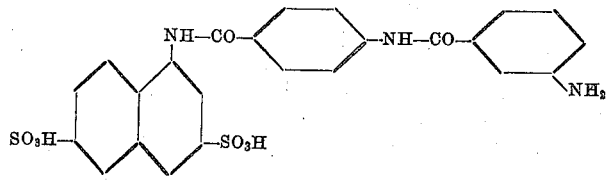

are dissolved in about 1000 parts of water and carbonate of soda to form the neutral salt. Then 50 parts of calcined carbonate of sodium are added, and phosgen is introduced into this solution at 40–50° C. in a slow current until an acidulated test portion does not react any more with sodium nitrite. The new acid is salted out. By dissolving in carbonate of soda and salting it out again, it is obtained as a white precipitate.

Example 4: 62.5 parts of the acid sodium salt obtained by the action of nitroanisoyl-chlorid on the reduced substituted derivative obtained from nitroanisoylchlorid and 1-aminonaphthalene-4.6-disulfonic acid and subsequent reduction which possesses the following formula:

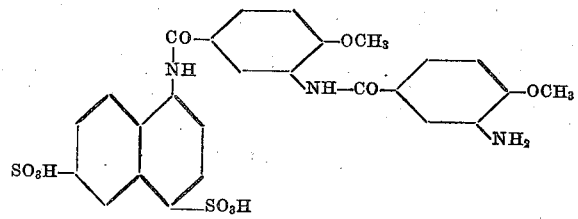

are dissolved in water and carbonate of soda to form the neutral salt. Then 50 parts of calcined sodium carbonate are added and phosgen is introduced as in Example 1. The reaction is finished, if on addition of nitrite of sodium to an acidulated test portion no diazotation takes place any more. The new acid thus obtained has the following formula:

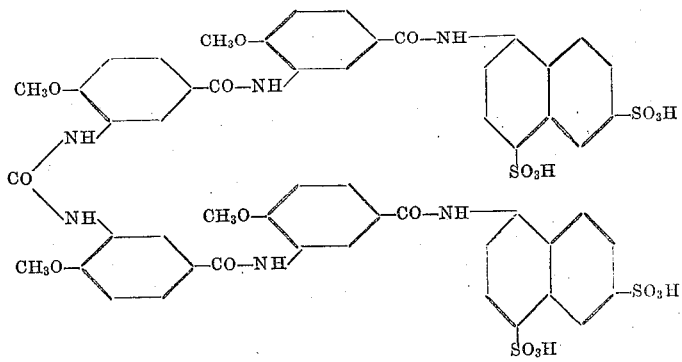

By dissolving the acid in carbonate of soda and salting it out again, it is obtained as a white precipitate. Even very dilute solutions of the acid make trypanosomes disappear from the blood of animals infected with them.

In a like manner ureas or thioureas with similar properties are obtained if other sulfonic acids such as 2.5.7- or 2.3.6-naphthylamindisulfonic acid or 1.4.6.8-naphthylamin-trisulfonic acid are employed.

Example 5: 50 parts of the acid sodium salt obtained by the action of meta-nitrobenzolsulfonylchlorid on 1.8-aminonaphthol-3.6-disulfonic acid and subsequent reduction which possesses the following formula:

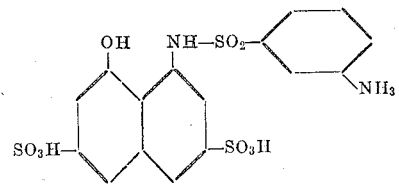

are dissolved with water and the required quantity of carbonate of soda to furnish the neutral salt. Then 50 parts of crystallized sodium acetate are added and phosgen is introduced as described in Example 1. The thus formed acid has the following formula:

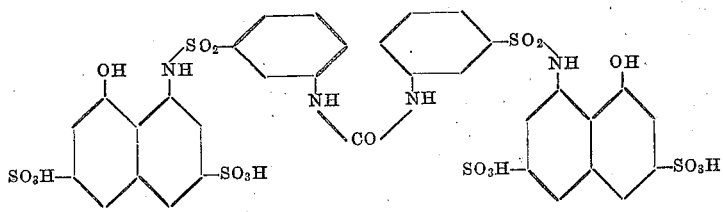

By dissolving the same with the addition of carbonate of soda and precipitating it by chlorid of sodium the neutral salt is obtained which is easily soluble in water. In the dry form the neutral salt is a faintly reddish powder. It forms azo dyes with diazobenzene.

Example 6: 63 parts of the acid sodium salt of the substitution derivative obtained by condensation of para-nitrocinnamylchlorid with the product of the reaction of para-nitro-cinnamylchlorid on 1.8-aminonaphthol-4.6-disulfonic acid and subsequent reduction which has the following constitution:

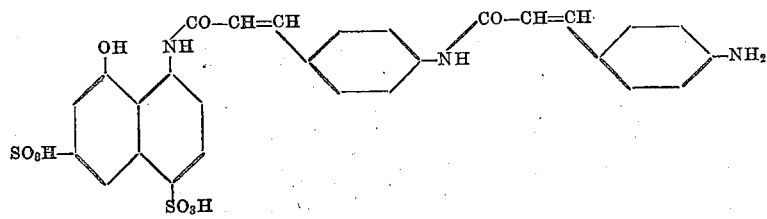

are dissolved in 1000 parts of water and treated with carbonate of soda, until the neutral salt is formed. Then 50 parts of crystallized sodium carbonate are added and while stirring phosgen is introduced in a slow current at a temperature of 40-45° C.

The treatment with phosgen is continued until an acidulated test sample shows no reaction with nitrate which means that there is no amino substance present any more. Already during the operation the ureid separates for the greatest part. After the end of the reaction chlorid of sodium is added in order to complete the separation. The free acid has the following constitution:

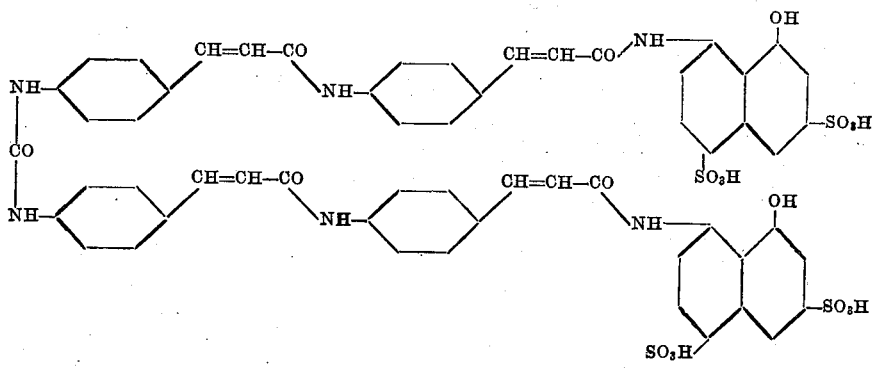

By dissolving the acid by means of carbonate of soda and subsequent addition of chlorid of sodium, the neutral salt of the above acid is precipitated as yellowish powder. The acid, when coupled with diazotized anilin, furnishes a clear red dyestuff.

In a like manner ureas or thioureas with similar properties are obtained if other sulfonic acids such as 1.5.7-, 2.5.7-, 2.8.6-aminonaphthol sulfonic acid, 2.5.1.7-, 1.5.2.7- or 2.8.3.6-aminonaphthol disulfonic acid are employed.

Example 7: 61 parts of the acid sodium salt obtained by the action of meta-nitrobenzoylchlorid on the reduced substituted derivative obtained from meta-nitrobenzoylchlorid and 1-amino-8-ethoxy-naphthalene-3.6-disulfonic acid and subsequent reduction which possesses the following formula:

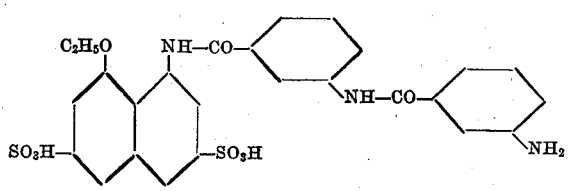

are dissolved in water and carbonate of soda to form the neutral salt. Then 50 parts of calcined sodium carbonate are added and phosgen is introduced. The reaction is finished, if on addition of nitrate of sodium no diazotation takes place any more. The new acid thus obtained has the following formula:

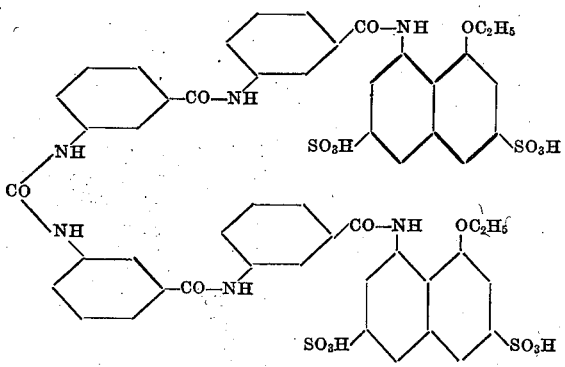

By dissolving the acid in carbonate of soda and salting it out again, it is obtained as a yellowish precipitate.

In a like manner ureas with similar properties are obtained if other sulfonic acids such as 1-amino-8-methoxy-4.6-disulfonic acid are employed; or if instead of the aminoacidyl groups of the examples other acidyl radicals are introduced, such as aminophenyl-acetic-acid-chlorid. The same or different acidyl radicals or aminonaphthalene compounds can be used.

Although we have above described examples by which the ureids and thioureids, etc., may be obtained, nevertheless, we do not wish to be understood as thereby excluding equivalents for the ingredients, or the operations employed in the process. It is probable that substitutes, for example, various kinds of aminobenzol derivatives, various aromatic acidyl halids and of aromatic sulfo acids, etc., may be employed without departing from the scope of the invention intended to be secured hereby.

We claim:—

1. As new products ureid compounds of substituted amino derivatives of aromatic substances characterized by containing in their molecule the general group:

A—NH—R—Y—NH— in which A stands for the monovalent aryl radical of an aromatic substance containing a sulfo group, R stands for the residue of an acid group, and Y for an aromatic radical containing no substituted amino groups, substantially as described.

2. As new products ureid compounds of substituted amino derivatives of aromatic substances characterized by containing in their molecule the general group:

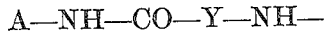

in which A stands for the monovalent aryl radical of an aromatic substance containing a sulfo group, and Y for an aromatic radical containing no substituted amino groups, substantially as described.

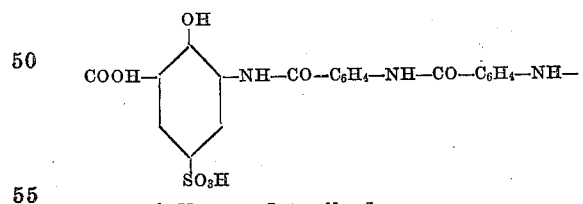

in which A stands for the aryl radical of an aromatic substance containing a sulfo group, substantially as described.

5. As new products ureid compounds of substituted amino derivatives of aromatic substances characterized by containing in their molecule the general group:

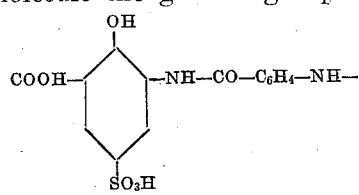

substantially as described.

6. As new products ureid compounds of substituted amino derivatives of aromatic substances characterized by containing in their molecule the general group:

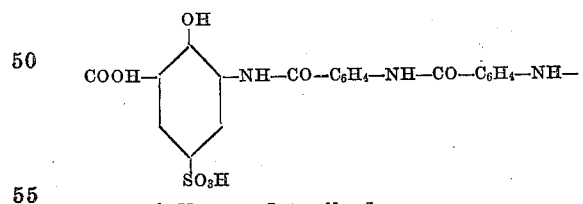

substantially as described.

7. As new products ureid compounds of substituted amino derivatives of aromatic substances characterized by the following formula:

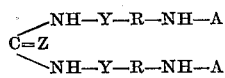

in which A stands for the aryl radical of an aromatic substance containing a sulfo group, R stands for the residue of an acid group, and Y for an aromatic radical, Z standing for a metalloid, forming salts with metals, substantially as described.

8. As new products ureid compounds of substituted amino derivatives of aromatic substances characterized by the following formula:

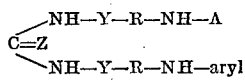

in which A stands for the aryl radical of an aromatic substance containing a sulfo group, R stands for the residue of an acid group, and Y for an aromatic radical, substantially as described.

3. As new products ureid compounds of substituted amino derivatives of aromatic substances characterized by containing in their molecule the general group:

$$A-NH-CO-C_6H_4-NH-$$

in which A stands for the aryl radical of an aromatic substance containing a sulfo group, substantially as described.

4. As new products ureid compounds of substituted amino derivatives of aromatic substances characterized by containing in their molecule the general group:

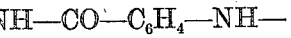

an aromatic substance containing a sulfo group, R stands for the residue of an acid group, and Y for an aromatic radical, Z standing for a metalloid, aryl standing for any aromatic radical, forming salts with metals, substantially as described.

9. As new products ureid compounds of substituted amino derivatives of aromatic substances characterized by the following formula:

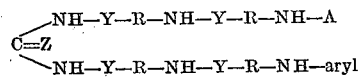

in which A stands for the aryl radical of an aromatic substance containing a sulfo group, R stands for the residue of an acid group, and Y for an aromatic radical, Z standing for oxygen or sulfur, aryl standing for any aromatic radical, forming salts with metals, substantially as described.

10. As new products ureid compounds of substituted amino derivatives of aromatic substances characterized by the following formula:

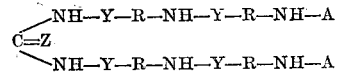

in which A stands for the aryl radical of an aromatic substance containing a sulfo group, R stands for the residue of an acid group, and Y for an aromatic radical, Z standing for oxygen or sulfur, forming salts with metals, substantially as described.

11. As new products ureids of substituted amino derivatives of aromatic substances characterized by the following formula:

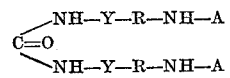

in which A stands for the aryl radical of an aromatic substance containing a sulfo group, R stands for the residue of an acid group, and Y for an aromatic radical, forming salts with metals, substantially as described.

12. As new products ureids of substituted amino derivatives of aromatic substances characterized by the following formula:

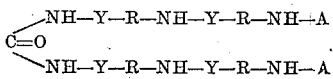

in which A stands for the aryl radical of an aromatic substance containing a sulfo group, R stands for the residue of an acid group, and Y for an aromatic radical, forming salts with metals, substantially as described.

13. As new products ureids of substituted amino derivatives of aromatic substances characterized by the following formula:

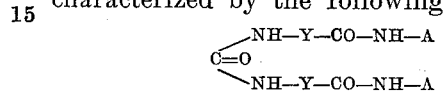

in which A stands for the aryl radical of an aromatic substance containing a sulfo group, Y stands for an aromatic radical, forming salts with metals, substantially as described.

14. As new products ureids of substituted amino derivatives of aromatic substances characterized by the formula:

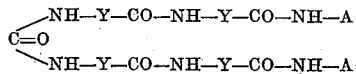

in which A stands for the aryl radical of an aromatic substance containing a sulfo group, Y stands for an aromatic radical, forming salts with metals, substantially as described.

15. As new products ureids of substituted amino derivatives of aromatic substances characterized by the following formula:

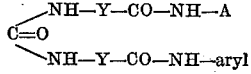

in which A stands for aryl radical of an aromatic substance containing a sulfo group, Y for an aromatic radical, aryl standing for any aromatic radical, forming salts with metals, substantially as described.

16. As new products ureids of substituted amino derivatives of aromatic substances characterized by the following formula:

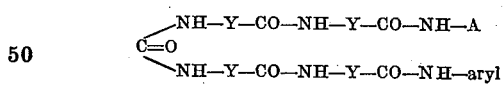

in which A stands for the aryl radical of an aromatic substance containing a sulfo group, Y stands for an aromatic radical, aryl standing for an aromatic radical, forming salts with metals, substantially as described.

17. As new products ureids of substituted amino derivatives of aromatic substances characterized by the following formula:

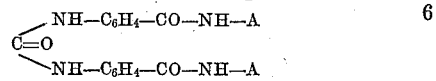

in which A stands for the aryl radical of an aromatic substance containing a sulfo-group, forming salts with metals, substantially as described.

18. As new products ureids of substituted amino derivatives of aromatic substances characterized by the following formula:

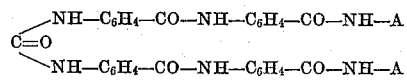

in which A stands for the aryl radical of an aromatic substance containing a sulfo group, forming salts with metals, substantially as described.

19. As a new product the ureid of a substituted aminosulfosalicylic acid having most probably the formula:

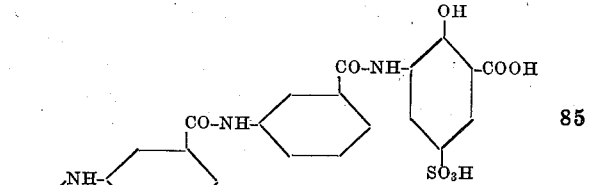

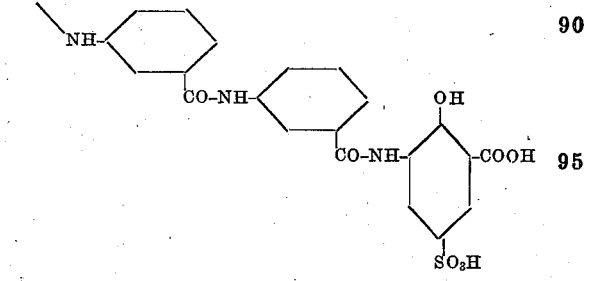

forming salts with metals and showing strong blood parasite destroying qualities, substantially as described.

In testimony whereof we have hereunto set our hands in the presence of two subscribing witnesses.

BERNHARD HEYMANN.
RICHARD KOTHE.
OSKAR DRESSEL.
ANTON OSSENBECK.

Witnesses:
  J. D. ZIESECKEY,
  J. UŸNESS.

It is hereby certified that in Letters Patent No. 1,218,654, granted March 13, 1917, upon the application of Bernhard Heymann, of Wiesdorf-on-the-Niederrhein, Richard Kothe, of Opladen, near Cologne, Oskar Dressel, of Mülheim, near Cologne, and Anton Ossenbeck, of Cologne, Germany, for an improvement in "Ureids and Thioureids," errors appear in the printed specification requiring correction as follows: Page 2, line 68, and page 3, line 6, for the word "sulfonyl" read *sulfo;* page 4, line 21, formula, for the symbol "$NH_3$" read *$NH_2$;* and that the said Letters Patent should be read with these corrections therein that the same may conform to the record of the case in the Patent Office.

Signed and sealed this 1st day of May, A. D., 1917.

[SEAL.]

R. F. WHITEHEAD,
*Acting Commissioner of Patents.*

Cl. 8—1.